Sept. 10, 1968     R. B. COOPER     3,400,823

MAGNETIC FILTER ASSEMBLY

Filed Jan. 5, 1967

United States Patent Office 3,400,823
Patented Sept. 10, 1968

3,400,823
MAGNETIC FILTER ASSEMBLY
Roydon B. Cooper, Locust Valley, N.Y., assignor to Pall
Corporation, Glen Cove, N.Y., a corporation of New
York
Filed Jan. 5, 1967, Ser. No. 607,426
5 Claims. (Cl. 210—223)

ABSTRACT OF THE DISCLOSURE

A magnetic filter assembly which separates both magnetic and non-magnetic particles from a fluid flowing therethrough is provided by the instant invention. Magnetic separation is accomplished by a magnetic separator plate disposed across the line of flow to a filter element. The separator plate has a plurality of nonradial slots, the edges of which are polarized by a magnet disposed centrally in an endwise position on the separator plate. Mechanical separation of non-magnetic particles is accomplished by a filter element disposed within the housing downstream of the separator plate.

This invention relates to a magnetic filter and, more particularly, it relates to a combined magnetic and mechanical filter assembly for removing both magnetizable and nonmagnetizable particles from a fluid.

In the past, generally flat strainers or filters have been provided in the sumps of fluid systems to ensure that large particles will not pass into the system fed by the circulation pump. Should a large particle enter the system, pump failure, component malfunction, and other severe damage can result. In addition to the danger of large particles entering the hydraulic systems, other smaller contaminants created by the normal wear that occurs on the moving metal surfaces can also enter the system and cause damage. In most systems these contaminants are small ferrous particles. If, in an attempt to remove these fine contaminants, a very fine sump strainer having a very high removal rating were to be used in place of the relatively coarse filters now used, it would quickly become clogged, and cavitation of the pump would result. However, since these particles are normally ferrous particles and therefore magnetizable, they can be removed from the system by a magnet. In the past, magnets have been strapped, and attached in a variety of other ways to filters. In fact, even magnetic filter elements have been provided. Such a filter element is disclosed in U.S. Patent No. 3,053,703 to Pall.

In this device, magnetic pole pieces which generate a magnetic field transverse to the direction of fluid flow are provided. The filter element, which is composed of both magnetic and nonmagnetic material, is interposed in the magnetic field to magnetize the magnetic material of the element to form a plurality of separate parallel magnetic elements within the filter element. Another device which provides a combined magnetic separator and filter is shown by Kisch, U.S. Patent No. 2,490,635. A third type of combined magnetic filter and separator is shown in U.S. Patent No. 2,838,179 to Thomas. Thomas provides magnetic removal of particles by attraction of magnetic particles to a plurality of magnets spaced about a filter element. Removal of non-magnetic material is provided by a filter element. This device, however, has the disadvantage that the magnetic field generated by the magnet is not utilized in the most efficient manner.

The instant invention provides an improved magnetic filter assembly in a compact unit which combines a mechanical filter with magnetic means for removal of magnetizable particles in a fluid. This unit comprises a housing having an inlet and an outlet; a filter element disposed within the housing across the line of flow from the inlet to the outlet; and an apertured particle-collecting magnetic separator generating a magnetic field across the apertures thereof, and disposed upstream of the filter element across the line of flow from the inlet to the filter element, such that all flow which passes through the filter element must initially pass through the apertures of the separator, whereby magnetizable particles suspended in the fluid to be filtered can be removed from the fluid by the separator, and other suspended particles can be removed by the filter element.

A preferred embodiment of filter assembly of the invention comprises a housing having inlet and outlet passages; a filter element disposed in the housing across the line of flow from the inlet to the outlet; a magnetizable particle-collecting separator plate having a plurality of non-radial slots therethrough disposed across the line of flow from the inlet to the filter element; and a magnet with one pole thereof disposed in proximity to the central portion of the plate generating a magnetic field across the slots of the plate; whereby suspended magnetic particles from the inlet first pass through the slots of the separator and through the magnetic field thereacross before reaching the filter element.

The term "magnetic" as usesd herein generically encompasses materials susceptible to being magnetized or which are magnets either permanently or temporarily as in the case of an electromagnet. The term "magnetized" is used herein to denote a temporary magnet, whose magnetic properties arise in a magnetic field or are only temporarily retained. "Magnetizable" is used herein to refer to materials susceptible to being magnetized.

The housing of the instant filter assembly will generally be shaped to enclose the filter element and support the separator in a manner such that fluid flowing through the assembly will first pass through the separator and then through the filter element to the outlet of the housing.

Since the filter element used in the instant invention is preferably a disk filter, the housing will preferably be formed as a short cylinder and thus, is adapted to enclose the filter element. The housing can also have a frusto-conically shaped portion which can taper from the cylindrical portion to the outlet of the housing. If a plurality of disk filters or a cylindrical filter cartridge is used in the instant assembly, naturally the housing will assume a cylindrical shape of greater length than that described above. The housing can be formed such that the separator will be supported at the inlet to thus expose the separator for easy cleaning and removal from the assembly.

The housing can be made from either magnetic material such as steel, or nonmagnetic material, such as plastic and can be formed by casting, stamping, molding, machining, or the like.

The filter element used in this assembly can be of any type, such as a disk filter, a corrugated disk filter, corrugated tubular filters, and the like. However, an annular disk-shaped filter element having radial corrugations is preferred. One such element is shown in U.S. Patent No. 2,843,218.

Suitable support and sealing members can be provided at the inner and outer peripheries of the disk. In the embodiment in which an annular disk filter element is provided, inner and outer sealing members such as Buna N bands can be provided to seal the filter element at its outer periphery against the housing, and to seal it at its inner periphery against a support member. The means for sealing and supporting the filter element are well known to those skilled in the art, and form no part of this invention.

The element used can be made of any desired filter media, such as wire mesh, sintered steel wire mesh, stainless steel wire mesh, plastic mesh, paper, asbestos, paper-asbestos combinations, resin-coated or impregnated fibrous filter media, and multilayer media and the like. Wire mesh elements having a 70 to 140 micron mesh are preferred. Several preferable examples of filter elements are disclosed in U.S. Patents No. 2,925,650 and 3,049,796 to Pall and U.S. Patents Nos. 3,158,532; 3,238,056; and 3,246,767 to Pall et al.

The housing can have any suitable support and sealing members such as rubber gaskets, grommets and the like to support and seal the filter element therein, such that all fluid passing through the housing is filtered.

The particle-collecting separator is disposed across the filter element, and upstream thereof. This separator is shaped preferably in the form of a disk or plate. However, other configurations such as a plurality of metallic strips could be used. The separator will normally be dimensioned to completely cover the inlet of the filter housing. This construction is adapted for the easy removal and cleaning of the separator. It can, however, fit tightly within the inlet of the housing to permit no fluid to bypass it. Appropriate sealing members can be provided to ensure this.

The separator is provided with a plurality of apertures. These apertures can generally be in any form, such as circular holes, slots, slits, and the like. However, a slotted configuration is preferred. These slots need not be of the same length and can be either straight or curved. The slots should be evenly distributed over the face of the collector plate, and, in a pattern, regular or irregular, of a sufficient number and size to accommodate the necessary flow volume. The slots can be formed with lips which can serve as a situs for particle collection. Space between the separator and the other components of the assembly should be provided on both the upstream and downstream side of the separator to provide room for particle collection on the plate.

In the preferred embodiment, a particle-collecting separator plate is provided with a plurality of non-radial slots disposed therethrough. A bar magnet is placed endwise, centrally on the collector plate. By this configuration of slots on the collector plate, and by such disposition of the magnet, a very desirable result can be obtained. That is, the separator acts as a pole piece for the magnet and a high flux magnetic field can be created across the lateral edges of the slots.

The field of the bar magnet, preferably a tubular bar magnet, will consist of a plurality of lines of force which form a plurality of equipotential surfaces. These lines will emanate from each end of the magnet and follow a continuous path between the ends of the magnet. If a magnet which is circular or annular in cross-section, such as a solid rod or tube, is selected, the field will form a plurality of semi-elliptical lines of force emanating from one end of the magnet and terminating at the other. These lines of force can be regarded as forming a plurality of equipotential surfaces radiating away from the magnet. The intensity of the magnetic field diminishes exponentially as distance from the magnet increases.

When such a magnet is disposed endwise and centrally on a collector plate having a plurality of non-radial slots, the field of magnet will pass through the slots. However, it is to be noted since the slots are non-radially disposed, the portions of each lateral edge, of the slots, which are directly opposite each other, will cross magnetic lines of force of different intensity. This will result in the creation of a magnetic field across the lateral edges of the slots and the polarization thereof.

Other dispositions of the magnet and the slots are also possible to effect the polarization of the slots. It is to be noted however that the example given above is the preferred embodiment of the instant invention.

The separator plate is made of a magnetic material, preferably a magnetizable material such as a ferrous metal, e.g., cadmium cold rolled steel. The plate could itself be a magnet, but in practice, the plate is generally not a magnet but is magnetizable, and is magnetized by some other outside source of magnetic energy. Electromagnets and permanent magnets are readily available commercially, and their use simplifies and economizes the production of the assembly.

When an external magnet is used to magnetize the separator, it will generally be placed in contact with it. However, it can be also disposed in close proximity thereto, as long as it creates a magnetic field across the separator plate and the slots thereof. Either the north or south pole of the magnet can be disposed to magnetize the separator.

Permanent magnets as well as electro-magnets can be used to magnetize the separator. It has been found in practice that the most efficient and inexpensive magnet for this purpose is an Alnico V permanent magnet. The magnet can be a solid bar magnet, a tubular bar magnet, or the like.

Since the magnet will, due to its magnetic attraction to the magnetizable separator, remain attached thereto without external support, none need be provided. The magnet can, however, be directly secured to the plate by a clamp or the like and the separator secured to the housing by similar means. In practice, it has been found desirable to supplement the magnetic attachment of the magnet to the separator with mechanical means such as a clamping device. This is preferably made of a nonferrous or nonmagnetic material such as brass.

In the preferred embodiment of this invention, an Alnico V permanent magnet in a tubular bar shape is held in contact with the center of the collector plate by a brass plate and bolt. A hole in provided at the center of the collector plate and the bolt engages a nut within the housing, and thereby holds the entire filter assembly together. Thus, the assembly can easily be disassembled for cleaning.

In operation, fluid flowing through the system will first pass through the high flux magnetic field across the apertures of the magnetic collector plate. Since the lateral edges of the plate are polarized, magnetizable particles will be attracted thereto and be retained thereon. The fluid will then pass to the filter element where nonferrous contaminants are removed by the element. The fluid is then free to pass to the outlet of the filter housing and through the system.

Thus, the magnetic sump filter assembly of the invention provides an apparatus which removes magnetizable particles from a system whereby the magnetizable particles are removed by a collector plate initially before they can pass through the filter element, and thus cannot clog the filter. Nonmagnetic contaminants are also removed from the system by the filter element. Full flow through a high flux magnetic field is attained and the magnetic plate is adapted for easy removal and cleaning.

This filter assembly is adapted to be used singly or to be connected to a manifold with several other similar filter assemblies.

Figure 1:
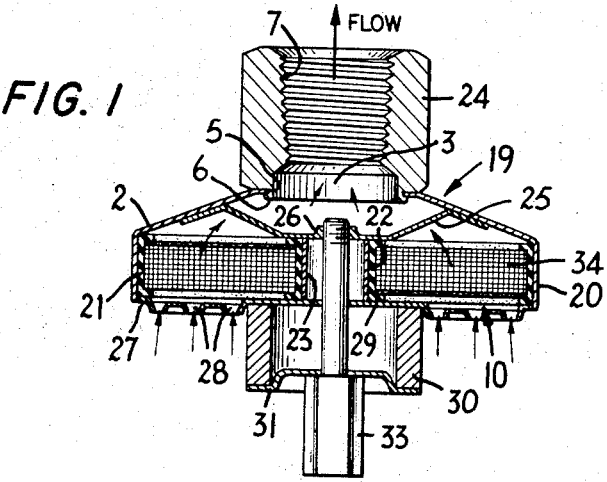
FIGURE 1 is a side view in section of one embodiment of the filter assembly of the invention.

The magnetic sump filter assembly of the instant invention is shown in FIGURE 1. This assembly includes a housing 19 made of cold rolled steel. This housing has a frustoconical base portion 2, and a cylindrical portion having a side wall 20. Into the open end 10 of the housing within wall 20 a filter element 34 is disposed in a close fit with wall 20 as shown. The filter element 34 of the filter assembly is an annular corrugated disk filter as described above and it is formed of stainless steel wire 70 micron mesh and has radial corrugations. A rubber sealing member 21 is disposed between the housing wall 20 and the element 34 to ensure a leakproof seal. The inner periphery of the filter element is sealed by a second rubber sealing member 22. A tubular metal support member 23 is disposed within the sealing member 22.

The base portion 2 has a central opening 3, within which a line mounting fitting 24 is fitted. The periphery of the opening 3 engages a recess 5 and a flange 6 at the base of the mounting fitting 24. The fitting has a tapered socket 7 for reception of a line. A support piece 25 is disposed on the downstream side of the filter element and provides support for the filter element within the housing. It also further provides a sealing surface for the inner peripheral seal of the element at the downstream side of the element. This support piece has a centrally located threaded aperture 26. The inlet of the housing is formed by the walls 20 which enclose the filter element 34.

On the upstream side of the filter element a cold rolled steel, slotted particle-collecting separator plate 27 is provided. This plate engages the walls of 20 of the housing at its periphery in a fluid tight seal such that all flow to the filter element must pass through the slots.

This collector plate 27 is formed with a depressed central portion 29 which seals against the inner peripheral seal 22 of the element on the upstream side of the seal to prevent leakage of fluid between the separator, and the ceneral portion of the filter element.

The apertures 28 of this plate in this embodiment are in the form of slots, which are nonradially disposed relative to the center of the plate. These slots are of two different lengths and are formed with lips which extend from the plate in a direction away from the filter element.

An Alnico V tubular bar magnet 30 is centrally disposed, endwise, on the collector plate 27 in the depressed portion 29. This bar magnet has its north pole disposed against the plate 27, and its south pole facing away therefrom. Thus, the lines of magnetic force will cross the lateral edges of slots 28 and the edges of the slots will be polarized due to the magnetic field thereacross, as described above.

A brass retainer plate 31, having a centrally located aperture is disposed at the south pole of this tubular bar magnet 30. A brass spacer bar 33 is disposed through this aperture. One end of this spacer bar 33 is in the form of a threaded rod which extends through the brass plate 31, through the apertured plate 27, and threadably engages the central aperture 26 of the support piece 25 within the housing. This brass spacer 33 has a thickened end which, when the rod is tightened by the threaded engagement, bears against the retainer plate 31, the magnet and the separator plate to thereby secure the apertured separator plate in a sealing relation against the walls of the housing 20 and against the inner peripheral seal 22. Thus, no leakage of fluid can occur between the plate and the filter element or between the plate and the housing.

Figure 2:
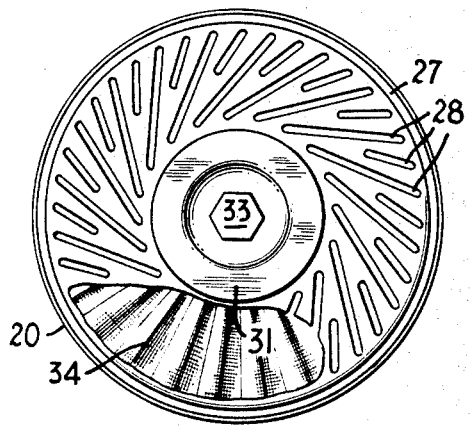
FIGURE 2 is a bottom view portably broken away of the assembly shown in FIGURE 1, showing the apertured separator.

FIGURE 2 shows the non-radial disposition of the slots 28 relative to the center of the plate and the magnet 30. All flow containing magnetizable particles will pass through the polarized slots and through the high flux magnetic field thereacross and efficient utilization of the high flux magnetic field created by the magnet 30 is accomplished.

Figure 3:
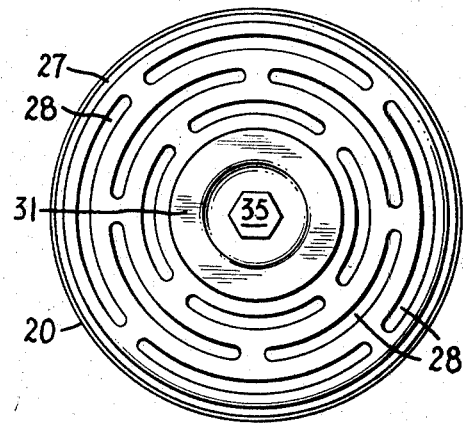
FIGURE 3 is a bottom view of the assembly showing another embodiment of the separator.

Another embodiment of the separator plate is shown in FIGURE 3. The separator plate of FIGURE 3 has a plurality of slots which are in the form of arcs of circles. These slots are perpendicular to radii at every point on the plate and a large number of these slots are uniformly disposed over the plate. Thus, in the same manner as described above, a magnetic field will be created across them.

The embodiment of the instant invention shown in FIGURE 2 is preferred. This embodiment has an improved magnetic circuit in the separator plate by providing a direct metal path from the magnet to each slot. In addition, this embodiment allows migration of the particles toward the magnet along the slot edges thereby allowing a greater number of particles to be collected at the extremities of the plate.

The filter assembly shown in FIGURE 1 is adapted to be used singly or in combination with a plurality of such assemblies. If a plurality of assemblies are used, a simple generally flat manifold can be provided to connect the outlet of each assembly to a common line.

Figure 4:
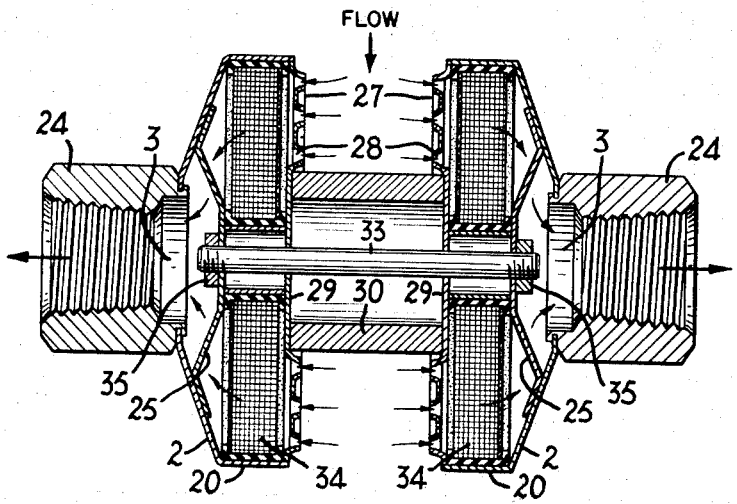
FIGURE 4 is a side view in section of another embodiment of the instant invention, which incorporates two filter elements and two separator plates.

It is also possible to provide a filter assembly having two filter elements, two separator plates and one magnet. Such a device is shown in FIGURE 4. In this embodiment of the instant invention, the brass retainer plate 31 is eliminated and another filter assembly is juxtaposed opposite to the original assembly. In this embodiment of the instant invention, the brass retainer plate 31 is eliminated and another filter assembly is juxtaposed opposite to the original assembly. In this embodiment, a longer brass rod 33 is used and this rod is threaded at both ends. Nuts 35 engage the ends of this rod on the downstream sides of both filter elements 34 to secure both assemblies together in a fluid tight seal. By this construction, a desirable result can be obtained. The plates 27 both of which are disposed at opposite poles of the tubular bar magnet 30 act as pole pieces and intensify the magnetic field of the magnet. This also intensifies the polarization of the slots of the plates, and therefore improves the removal of magnetizable particles from the fluid. Naturally, an apparatus utilizing the magnetic filter assembly of FIGURE 4, since each of these assemblies has two outlets, would employ a different manifold from that which would be used in connection with the embodiment of FIGURE 1. Such a manifold would require two connecting lines for each filter assembly.

It is also possible to eliminate the nuts 35 and secure the assemblies together by clamps and the like. Another alternative is to provide a right-hand thread on one end of the bolt 33 and a left-hand thread on the other, and secure the assemblies together by engagement of the bolt 33 and the apertured plates 25.

In the operation of all embodiments of this invention, all flow passing to the filter element must pass through the apertured plates and through the magnetic field. Therefore, the plate is magnetized and the slots have a high flux magnetic field thereacross. Magnetizable particles will be removed from the fluid flow therethrough and be retained on the plate. These particles can be easily cleaned from the plate. The other nonmagnetic contaminants will be removed by the wire mesh corrugated annular disk filter 34.

Thus, the magnetic filter of the instant invention makes efficient use of the magnetic field of the tubular bar magnet, and provides a filter assembly which can remove fine nonmagnetic particles as well as substantially all magnetizable particles from a fluid to be filtered.

Having regard to the foregoing disclosure, the following is claimed as the inventive and patentable embodiments thereof:

1. A magnetic filter assembly comprising, in combination, a housing having an inlet and an outlet; a filter element disposed in the housing across the line of flow from the inlet to the outlet; a magnetic particle-collecting separator plate having a plurality of slots therethrough disposed across the line of flow to the filter element to intercept all flow to the filter element; and a magnet disposed centrally in an endwise position relative to the separator plate with one pole thereof in close juxtaposition with the separator plate, said slots extending from adjacent the magnet toward the periphery of the plate, in a direction skew to the radii of the plate, and said slots having lips, said lips extending from the plate on the upstream side thereof and defining the entire circumference of each slot to form, between the slots, space for particle collection on the upstream surface of the plate, said separator plate positioned to act as a pole piece for the magnet so that said magnet generates a magnetic field across the slots of said separator plate to polarize the edges thereof, said plate being so disposed that suspended particles in the fluid passing through the filter assembly must initially pass through the slots of the separator plate and thereby through the magnetic field, and thereafter through the filter element, whereby magnetizable particles can be removed and retained by the separator plate and other contaminants by the filter element.

2. A magnetic filter assembly in accordance with claim 1 including a second filter element disposed within a second housing, and a second magnetic separator plate as defined in claim 1 disposed in the line of flow to the second filter element to intercept all flow to the second filter element, said second separator plate being in close juxtaposition to the other pole of the magnet with said magnet being disposed generally centrally relative to said second separator plate, said second separator plate also positioned to act as a pole piece for the magnet so that said magnet generates a magnetic field across the slots of said second separator plate to polarize the edges thereof.

3. A magnetic filter assembly in accordance with claim 1 in which the filter element is an annular corrugated disk shaped filter element.

4. A filter assembly in accordance with claim 1 in which the magnet is a tubular bar magnet.

5. A magnetic filter assembly in accordance with claim 1 in which the filter element is an annular corrugated filter element; in which the separator plate is annular; and in which the magnet is a tubular bar magnet; and including sealing means disposed within the housing at the periphery of the plate and at the central annulus of said plate to prevent leakage of fluid by said plate; retaining means holding said magnet against the said separator plate, said retaining means engaging said magnet and extending through the central annulus of said separator plate and the central annulus of said filter; and anchoring means within the housing on the downstream side of said filter, and engaging said retaining means in a manner to retain said magnet on said plate and said plate in a sealing relationship against the sealing means within the housing, and said filter element within the housing.

References Cited

UNITED STATES PATENTS

| | | | |
|---|---|---|---|
| 1,778,910 | 10/1930 | Niven | 210—223 |
| 2,014,800 | 9/1935 | Deguenther | 210—223 |
| 2,149,764 | 3/1939 | Frei | 210—223 |
| 2,459,534 | 1/1949 | Kennedy | 210—223 |
| 2,959,287 | 11/1960 | Davis et al. | 210—223 |
| 3,072,258 | 1/1963 | Saxby | 210—223 X |
| 3,186,549 | 6/1965 | Potstiber | 210—222 X |

FOREIGN PATENTS

| | | |
|---|---|---|
| 1,276,226 | 10/1961 | France. |
| 427,926 | 6/1925 | Germany. |
| 272,784 | 6/1927 | Great Britain. |
| 557,214 | 11/1943 | Great Britain. |

REUBEN FRIEDMAN, *Primary Examiner.*

W. S. BRADBURY, *Assistant Examiner.*